(12) United States Patent
Erhart et al.

(10) Patent No.: US 9,460,329 B2
(45) Date of Patent: *Oct. 4, 2016

(54) SYSTEM, DEVICE AND METHOD FOR SECURING A USER DEVICE COMPONENT BY AUTHENTICATING THE USER OF A BIOMETRIC SENSOR BY PERFORMANCE OF A REPLICATION OF A PORTION OF AN AUTHENTICATION PROCESS PERFORMED AT A REMOTE COMPUTING LOCATION

(71) Applicant: SYNAPTICS INCORPORATED, San Jose, CA (US)

(72) Inventors: Richard Alex Erhart, Tempe, AZ (US); Frank Schwab, Phoenix, AZ (US)

(73) Assignee: Synaptics Incorporated, San Jose, CA (US)

( * ) Notice: Subject to any disclaimer, the term of this patent is extended or adjusted under 35 U.S.C. 154(b) by 385 days.

This patent is subject to a terminal disclaimer.

(21) Appl. No.: 14/194,709

(22) Filed: Mar. 1, 2014

(65) Prior Publication Data

US 2014/0177929 A1 Jun. 26, 2014

Related U.S. Application Data

(62) Division of application No. 12/507,689, filed on Jul. 22, 2009, now Pat. No. 8,698,594.

(60) Provisional application No. 61/082,799, filed on Jul. 22, 2008.

(51) Int. Cl.
*G06K 9/00* (2006.01)
*G06F 21/32* (2013.01)

(52) U.S. Cl.
CPC ........... *G06K 9/00013* (2013.01); *G06F 21/32* (2013.01)

(58) Field of Classification Search
USPC .......................................... 382/115
See application file for complete search history.

(56) References Cited

U.S. PATENT DOCUMENTS

| 5,995,630 | A | 11/1999 | Borza |
| 6,332,193 | B1* | 12/2001 | Glass ..................... G06F 21/32 713/170 |
| 6,741,729 | B2* | 5/2004 | Bjorn ..................... G06F 21/32 340/5.83 |
| 6,799,275 | B1 | 9/2004 | Bjorn |
| 7,549,161 | B2* | 6/2009 | Poo ........................ G06F 21/32 713/172 |
| 7,693,279 | B2 | 4/2010 | Chen et al. |

(Continued)

FOREIGN PATENT DOCUMENTS

| EP | 2321764 A1 | 5/2011 |
| GB | 2474999 B1 | 2/2013 |

(Continued)

*Primary Examiner* — Ishrat I Sherali
(74) *Attorney, Agent, or Firm* — Leydig, Voit & Mayer, Ltd.

(57) ABSTRACT

A novel system, device and method of validation is provided for sensing a biometric such as a fingerprint, where biometric data corresponding to the biometric entity such as a fingerprint is then transmitted to a host configured to perform a plurality of authentication processes to authenticate the biometric data. At least one of the plurality of authentication steps is then validated. Alternatively, a portion of the biometric data may be retained, where biometric data corresponding to the biometric is then transmitted to a host configured to perform a plurality of authentication steps to authenticate the biometric data. At least one of the plurality of authentication steps is then validated.

20 Claims, 13 Drawing Sheets

(56) References Cited

U.S. PATENT DOCUMENTS

| | | | |
|---|---|---|---|
| 7,826,645 B1 | 11/2010 | Cayen | |
| 7,936,905 B2 * | 5/2011 | Takahashi | G06F 21/32 382/115 |
| 8,063,734 B2 | 11/2011 | Conforti | |
| 8,332,648 B2 * | 12/2012 | Morijiri | G06F 21/32 713/176 |
| 8,560,004 B1 * | 10/2013 | Tsvetkov | H04M 1/67 310/328 |
| 8,698,594 B2 * | 4/2014 | Erhart | G06F 21/32 340/5.1 |
| 2002/0089410 A1 | 7/2002 | Janiak et al. | |
| 2003/0068072 A1 | 4/2003 | Hamid | |
| 2003/0141959 A1 | 7/2003 | Keogh et al. | |
| 2004/0104807 A1 * | 6/2004 | Ko | G06K 9/00006 340/5.83 |
| 2004/0125993 A1 | 7/2004 | Zhao et al. | |
| 2005/0238212 A1 | 10/2005 | Du et al. | |
| 2006/0214767 A1 | 9/2006 | Carrieri | |
| 2007/0180261 A1 | 8/2007 | Akkermans et al. | |
| 2007/0237368 A1 | 10/2007 | Bjorn et al. | |
| 2007/0248249 A1 | 10/2007 | Stoianov | |
| 2008/0013805 A1 | 1/2008 | Sengupta et al. | |
| 2008/0019578 A1 | 1/2008 | Saito et al. | |
| 2008/0049987 A1 | 2/2008 | Champagne et al. | |
| 2009/0066478 A1 | 3/2009 | Colella | |
| 2009/0140838 A1 | 6/2009 | Newman et al. | |
| 2009/0212902 A1 | 8/2009 | Haddock | |
| 2010/0117794 A1 | 5/2010 | Adams et al. | |

FOREIGN PATENT DOCUMENTS

| | | |
|---|---|---|
| TW | 200606746 A | 2/2006 |
| TW | 200614092 A | 5/2006 |
| TW | 200617798 A | 6/2006 |
| WO | 2010036445 A1 | 4/2010 |

\* cited by examiner

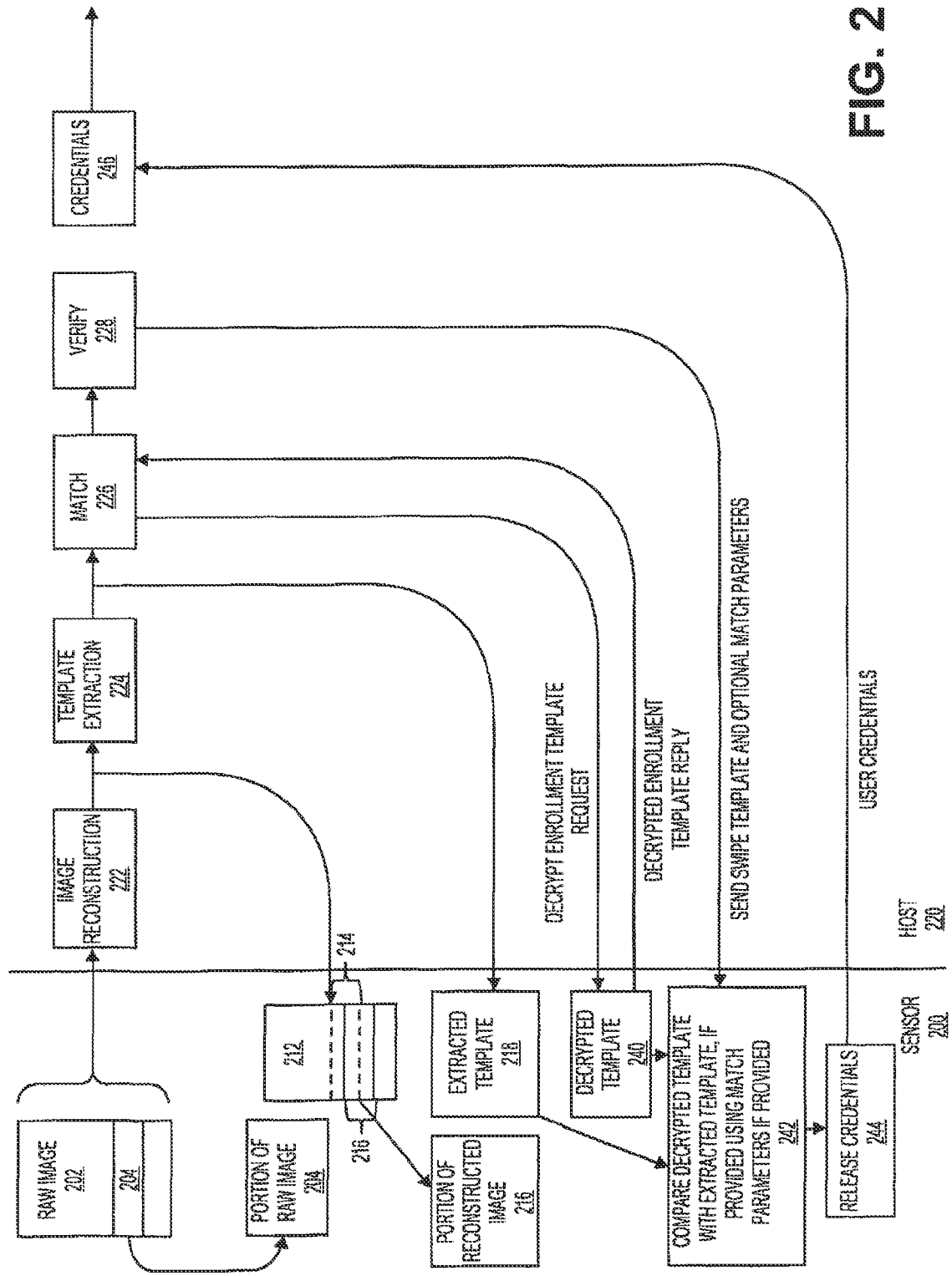

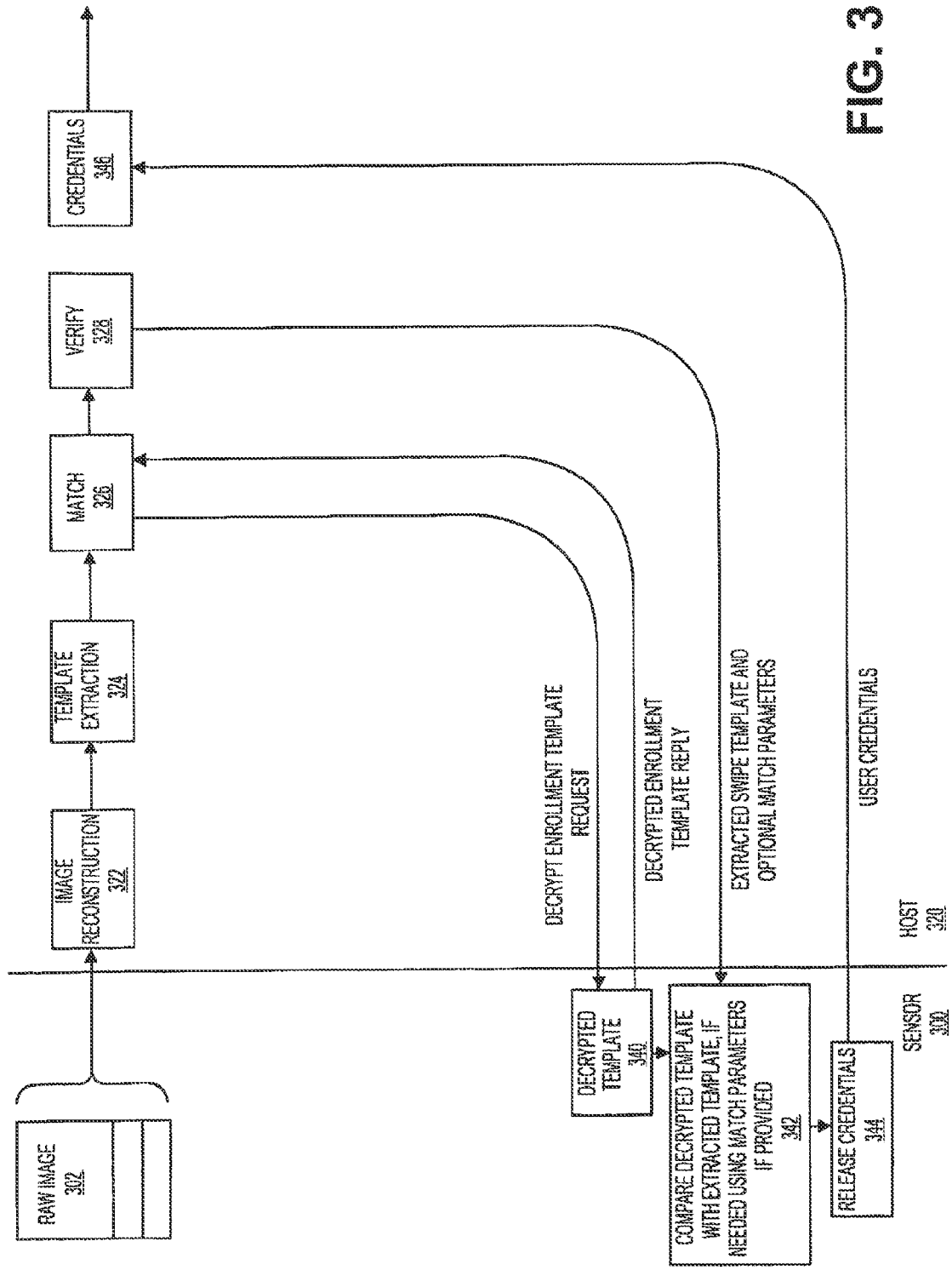

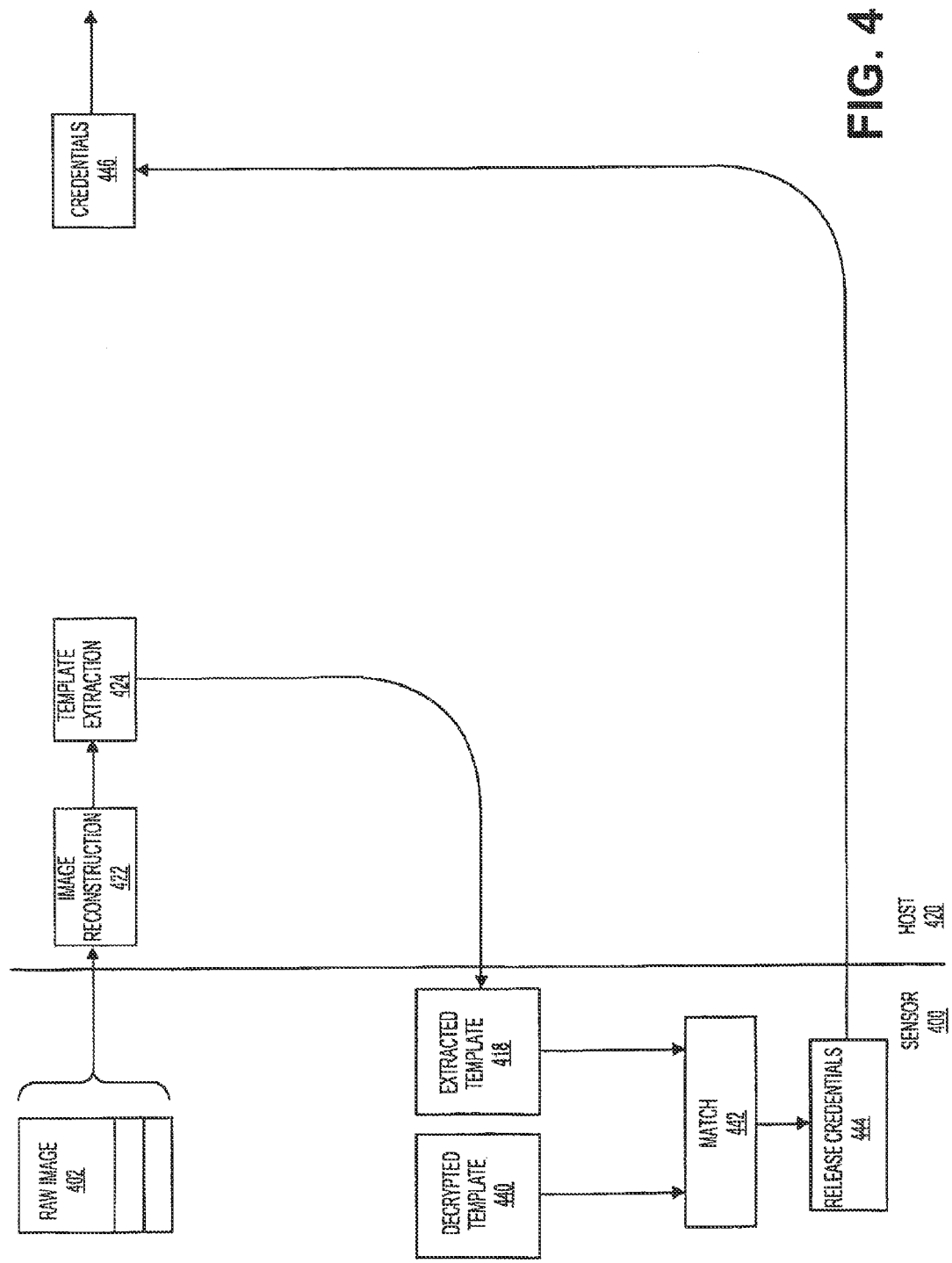

SYSTEM, DEVICE AND METHOD FOR SECURING A USER DEVICE COMPONENT BY AUTHENTICATING THE USER OF A BIOMETRIC SENSOR BY PERFORMANCE OF A REPLICATION OF A PORTION OF AN AUTHENTICATION PROCESS PERFORMED AT A REMOTE COMPUTING LOCATION

RELATED APPLICATIONS

This application claims priority to U.S. Utility application Ser. No. 12/507,689 filed on Jul. 22, 2009, which claims priority to U.S. Provisional Patent Application No. 61/082,799, filed on Jul. 22, 2008, entitled "System, Device and Method for Securing a Device Component."

Fingerprint sensors are gaining increasing acceptance as a convenient method to ensure security in a wide variety of applications and contexts. However, current fingerprint match systems are subject to attack on the software running on the host computer that could allow an attacker to bypass a fingerprint security system. For example, FIG. 1 shows a diagram of prior art design for a fingerprint system. In this prior art example that is commonly used in industry, the fingerprint sensor 100 transmits raw fingerprint data 102 to the host 110. The host 110 performs Image Reconstruction at step 112, which processes the raw fingerprint 102 to create a standardized fingerprint image. The host then performs Template Extraction (TE) at step 114, which reduces the fingerprint image to a small series of minutiae. It is important to note that "minutiae" are not the only generally accepted template format and that others are possible. The host 110 then at step 116 compares the minutiae from this swipe against a database of "enrollment templates," to identify the user who submitted this swipe. The output of the comparison is a "match score," showing how well the enrollment template and the just-swiped template match. At step 118, if the match score is above a specified threshold, the fingerprint is considered "matched" and the user is granted access at step 120. Otherwise, the user is denied access at 122.

Although the above verification method may provide a relatively acceptable level of security against many intruders, it may not be sufficient for those intruders willing to make an extra effort to, for example, hack the host software. That is, if the intruder were to successfully attack the host software, he may be able to bypass the security system.

In order to boost security, an additional level of security may be implemented on the sensor itself However, the memory and processor power required for a full verification process on the sensor would significantly increase the cost of the sensor.

Hence, it is desirable to have a solution without the above-described disadvantages. As will be seen, the invention provides such a solution in an elegant manner.

BRIEF DESCRIPTION OF THE DRAWINGS

FIG. 2 illustrates an embodiment of the invention.
FIG. 3 illustrates another embodiment of the invention.
FIG. 4 illustrates another embodiment of the invention.

DETAILED DESCRIPTION OF THE INVENTION

Figure 1:
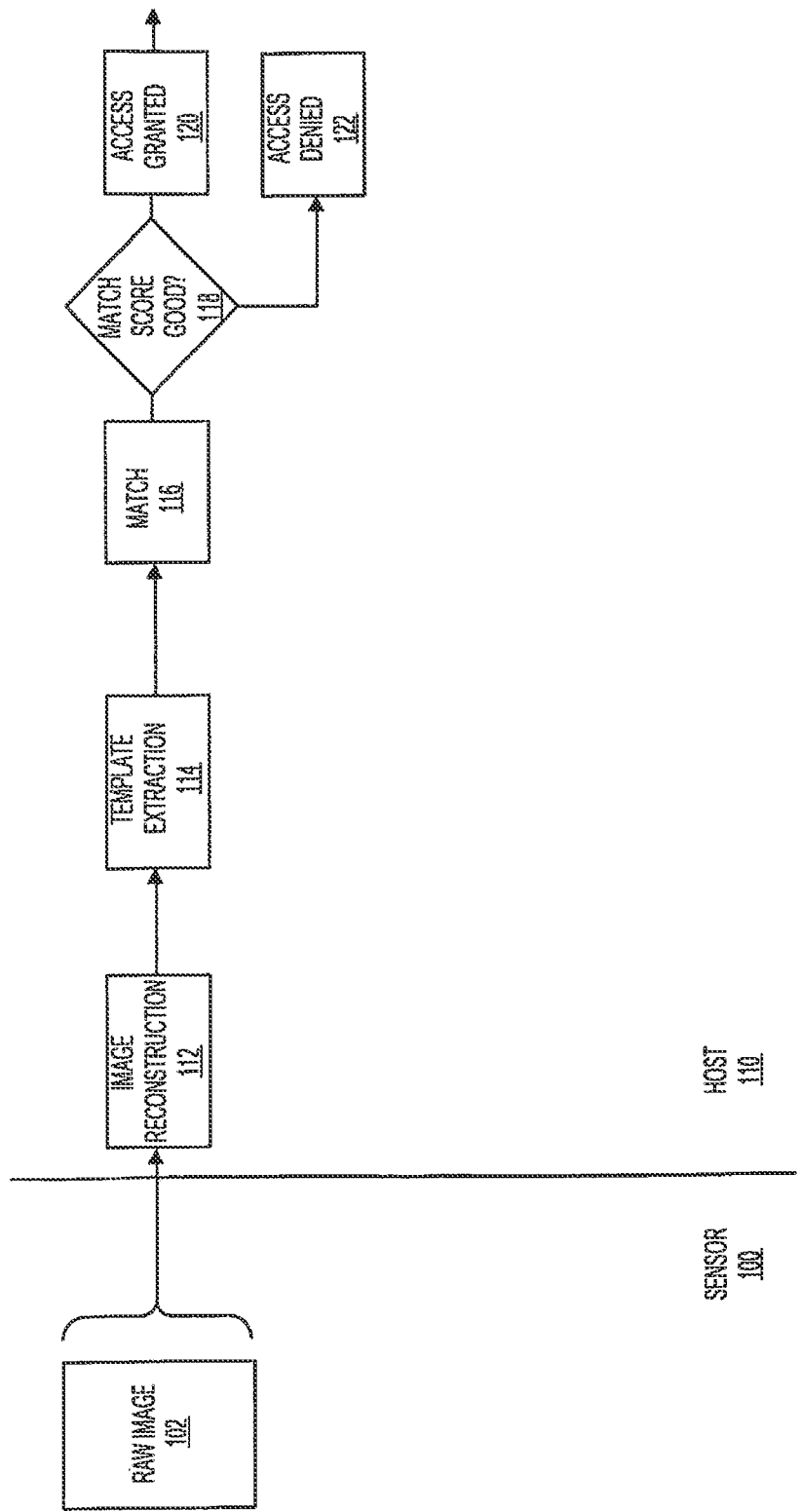
FIG. 1 illustrates an embodiment of the prior art.

The invention is directed to a device, system and method for securely authenticating a component or subsystem with a host system. In one embodiment, a biometric sensor such as a fingerprint sensor is configured according to the invention to authenticate itself to a host system with a novel and unique method and configuration. In one embodiment, the fingerprint sensor is used to verify the image processing steps taken by the host, without having the memory and processor power to do the entire set of steps itself. This provides a significant improvement to the security of a system incorporating a fingerprint sensor without having to increase the cost of the fingerprint sensor.

In this specification, references will be made to a sensor, host, or other entities that perform operations of methods configured according to the invention. It will be understood by those skilled in the art that such operations can be performed by many different types and designs of biometric sensors and also different types of hosts. One of the definitions of biometric, as used herein, is a measure of a biological feature into a digital representation, value or numerical or mathematical expression that identifies the biological feature for use in identifying a person associated with the feature. The biometric sensors may include for example fingerprint sensors such as swipe or scanning sensors, face recognition scanners or cameras, retina scan sensors, or other types of biometric sensors. References to fingerprint sensors in particular are made below in the description of examples of devices and systems configured according to certain embodiments of the invention, and also methods to be performed according to different embodiments of the invention. The sensor may have its own controls or one or more dedicated processors the perform functions according to the invention, and may include a microprocessor or logic circuitry. Examples below include references to fingerprint sensors as examples, but are presented for illustration and are in no way intended to limit the scope and spirit of the invention, which is defined by the appended claims, their equivalents, and future prospective claims and claims presented in related applications.

For example, in one embodiment, a method configured according to the invention first senses a biometric value such as fingerprint. Then, fingerprint data corresponding to the fingerprint is transmitted to a host configured to perform a plurality of authentication processes to authenticate the fingerprint data. At least one of the plurality of authentication steps is then validated.

Another method configured according to the invention senses a biometric identity such as fingerprint and retains a portion of the fingerprint data. Then, fingerprint data corresponding to the fingerprint is transmitted to a host configured to perform a plurality of authentication steps to authenticate the fingerprint data. At least one of the plurality of authentication steps is then validated.

The invention is directed to a novel device, system and method for securing a device, such as between a biometric sensor and a host (a system processor for example). More particularly, the invention is directed to a method for sensing a biometric, such as a biometric fingerprint sensor sensing a fingerprint, then transmitting fingerprint data corresponding to the fingerprint to a host configured to perform a plurality of authentication steps to authenticate the fingerprint data. Given such a device that can be paired with a host device or system, the host device or system configured according to the invention can then validate at least one of the plurality of authentication steps. The immense benefit such a device, system and method can provide may be realized in many applications, such as for example enabling a fingerprint sensor to be authenticated and validated in conjunction with a system processor of a device in which the fingerprint sensor is integrated—a laptop computer or a cellular telephone for example. The various embodiments incorporate features that optimize use of the invention in a variety of applications.

The authentication steps may include reconstructing a fingerprint image with the fingerprint data, extracting a swipe template from the fingerprint image, and matching the swipe template with an enrollment template. In this embodiment, the extracted swipe template includes a series of minutiae. If the enrollment template has been encrypted during an enrollment process, the host obtains the decrypted enrollment template by sending a request to the sensor to decrypt the enrollment template and receiving the decrypted enrollment template. The matching produces a match parameter, which, along with the extracted swipe template, is transmitted to the sensor. The sensor validates the authentication by comparing the enrollment template with the swipe template using the match parameter.

Alternatively, the extracted swipe template may be received from the host. In this embodiment, the sensor then matches the received swipe template with an enrollment template to produce a first result. Similarly, the host matches the swipe template with an enrollment template to produce a second result. The sensor receives the second result from the host and compares the second result with the first result to produce a comparison result. The sensor releases credentials to the host based on the comparison result.

In another series of embodiments, the sensor may retain a portion of the fingerprint data, which is transmitted to the host. The host is configured to perform a plurality of authentication steps to authenticate the fingerprint data, at least one of which is validated. These steps may include reconstructing a fingerprint image with the fingerprint data. The portion of the fingerprint data may be randomly selected and of a resolution lower than that of the fingerprint data transmitted to the host. The validating steps may include the sensor receiving the fingerprint image from the host, verifying similarity between the retained portion of the fingerprint data and a corresponding portion of the fingerprint image, discarding the portion of the fingerprint data, and retaining a section of the fingerprint image. In this embodiment, the host extracts a swipe template from the fingerprint image, which includes a series of minutiae, and transmits the extracted swipe template to the sensor. The sensor verifies similarity between minutiae existing in the retained section of the fingerprint image and the series of minutiae of the swipe template, discards the section of the fingerprint image, and retains the swipe template. The swipe template is then matched with an enrollment template which, if encrypted during an enrollment process, is decrypted during the matching procedure. This matching produces a match parameter, which the sensor receives from the host along with the extracted swipe template. The sensor validates the authentication by comparing the enrollment template with the swipe template using the match parameter.

In any of the above embodiments, receiving credentials indicates successful validation. The credentials may include a decryption key configured to allow decryption of a data storage medium.

In an alternative series of embodiments, the invention is directed to providing a host, such as a processor, that is configured to authenticate and validate a biometric sensor. In such a configuration, a method is provided that, from the host's point of view, includes receiving fingerprint data corresponding to a sensed fingerprint, then performing a plurality of authentication steps to authenticate the fingerprint data, and then transmitting data to a sensor configured to perform a validation of at least one of the plurality of authentication steps.

These authentication steps may include reconstructing a fingerprint image with the fingerprint data, extracting a swipe template from the fingerprint image, and matching the swipe template with an enrollment template. The extracted swipe template may include a series of minutiae. If the enrollment template has been encrypted during an enrollment process, the host obtains the decrypted enrollment template by sending a request to the sensor to decrypt the enrollment template and receiving the decrypted enrollment template. The matching may produce a match parameter, which along with the extracted swipe template, is transmitted to the sensor. The sensor validates the authentication by comparing the enrollment template with the swipe template using the match parameter.

Alternatively, the extracted swipe template may be transmitted to the sensor, which is configured to match the transmitted swipe template with an enrollment template to produce a first result. In this embodiment, the host also matches the swipe template with an enrollment template to produce a second result. The second result is transmitted to the sensor, which is configured to compare the second result with the first result to produce a comparison result. The host receives credentials from the sensor based on the comparison result.

In another embodiment, the sensor may retain a portion of the fingerprint data, which is used to reconstruct a fingerprint image. The host then transmits the fingerprint image to the sensor, which verifies similarity between the retained portion of the fingerprint data and a corresponding portion of the fingerprint image, discards the portion of the fingerprint data, and retains a section of the fingerprint image. The host then extracts a swipe template from the fingerprint image, which includes a series of minutiae, and transmits the extracted swipe template to the sensor. The sensor verifies similarity between minutiae existing in the retained section of the fingerprint image and the series of minutiae of the swipe template, discards the section of the fingerprint image, and retains the swipe template. The swipe template is then matched with an enrollment template which, if encrypted during an enrollment process, is decrypted by sending a request to the sensor to decrypt and receiving a decrypted enrollment template. This matching produces a match parameter, which is transmitted to the sensor along with the extracted swipe template. The sensor validates the authentication by comparing the enrollment template with the swipe template using the match parameter.

In any of the above embodiments, receiving credentials indicates successful validation. The credentials may include a decryption key configured to allow decryption of a data storage medium.

In an alternative series of embodiments, the host receives fingerprint data corresponding to a sensed fingerprint and performs a plurality of authentication steps to authenticate the fingerprint data. These steps include reconstructing a fingerprint image with the fingerprint data, extracting a first swipe template from the fingerprint image, using an application matcher to match the first swipe template with an enrollment template of a first format, and extracting a second swipe template from the fingerprint image. Using a host matcher, the second swipe template is matched with an enrollment template of a second format to produce a host match result. The first format and the second format are different; the first format is compatible with the application matcher, and the second format is compatible with the host matcher. The host then transmits data to a sensor configured to perform a validation of at least one of the plurality of authentication steps.

In one embodiment, the transmitted data includes the extracted second swipe template, which the sensor matches with an enrollment template to produce a sensor match result. If the sensor match result indicates a match, the host receives credentials indicating successful validation.

In another embodiment, the host match result is transmitted to the sensor, which compares the host match result with the sensor result to produce a comparison result. The host receives credentials from the sensor based on the comparison result.

In an alternative series of embodiments, the invention is directed to a system and method comprising a biometric fingerprint sensor and a host. The system is configured to facilitate the communication of fingerprint and authentication data between sensor and host. In such a configuration, a method is provided that, from the system's point of view, includes the sensor sensing a fingerprint and transmitting fingerprint data corresponding to the fingerprint from the sensor to the host. The system performs, at the host, a plurality of authentication steps to authenticate the fingerprint data and validates, at the sensor, at least one of the plurality of authentication steps.

These steps may include reconstructing a fingerprint image with the fingerprint data, extracting a swipe template from the fingerprint image, and matching the swipe template with an enrollment template. If the enrollment template is encrypted during an enrollment process, a request is sent from the host to the sensor to decrypt the enrollment template, in response to which a decrypted enrollment template is sent from the sensor to the host. The matching produces a match parameter, which along with the extracted swipe template, is transmitted from the host to the sensor. The match parameter is used to compare the enrollment template with the swipe template.

Alternatively, the extracted swipe template may be transmitted from the host to the sensor and matched, at the sensor, with an enrollment template to produce a first result. Similarly, at the host, the swipe template is matched with an enrollment template to produce a second result. The second result is transmitted from the host to the sensor, where the second result is compared with the first result to produce a comparison result. Credentials are released from the sensor to the host based on the comparison result.

In another embodiment, the system may retain at the sensor a portion of the fingerprint data, which is used to reconstruct a fingerprint image. The host's copy of the fingerprint image is then transmitted from the host to the sensor, which verifies similarity between the retained portion of the fingerprint data and a corresponding portion of the fingerprint image, discards the portion of the fingerprint data, and retains a section of the fingerprint image. A swipe template, which includes a series of minutiae, is then extracted from the fingerprint image and transmitted from the host to the sensor. The sensor then verifies similarity between minutiae existing in the retained section of the fingerprint image and the series of minutiae of the swipe template, discards the section of the fingerprint image, and retains the swipe template. The swipe template is then matched with an enrollment template. If the enrollment template is encrypted during an enrollment process, a request is sent from the host to the sensor to decrypt the enrollment template, in response to which a decrypted enrollment template is sent from the sensor to the host. the matching produces a match parameter, which along with the extracted swipe template, is transmitted from the host to the sensor and used to compare the enrollment template with the swipe template.

In any of the above embodiments, releasing of credentials from the sensor to the host indicates successful validation. The credentials may include a decryption key configured to allow decryption of a data storage medium.

In an alternative series of embodiments, a fingerprint is sensed at a sensor and fingerprint data corresponding to the fingerprint is transmitted from the sensor to a host. At the host, a plurality of authentication steps to authenticate the fingerprint data is performed. These steps include reconstructing a fingerprint image with the fingerprint data, extracting a first swipe template from the fingerprint image, using an application matcher to match the first swipe template with an enrollment template of a first format, and extracting a second swipe template from the fingerprint image. At least one of the plurality of authentication steps is validated at the sensor.

The extracted second swipe template is then transmitted from the host to the sensor, where it is matched with an enrollment template to produce a sensor match result. In one embodiment, if the sensor match result indicates a match, credentials are released from the sensor to the host.

In another embodiment, the second swipe template is matched at the host with an enrollment template of a second format using a host matcher to produce a host match result. The first format and the second format may be different; the first format is compatible with the application matcher, and the second format is compatible with the host matcher. The host match result is then transmitted from the host to the sensor, where it is compared with the sensor result to produce a comparison result. Credentials are released from the sensor to the host based on the comparison result.

In any of the above embodiments, releasing of credentials from the sensor to the host indicates successful validation.

In another embodiment, a fingerprint is sensed and fingerprint data corresponding to the fingerprint is transmitted to a host configured to perform a plurality of authentication steps to authenticate the fingerprint data. These steps include reconstructing a fingerprint image with the fingerprint data, extracting a swipe template from the fingerprint image, and matching the swipe template with an enrollment template to produce a second result. The extracted swipe template is then received from the host and matched with an enrollment template to produce a first result. The second result is then received from the host and compared with the first result to produce a comparison result. Credentials are released based on the comparison result.

In another embodiment, a biometric is sensed and biometric data corresponding to the biometric is transmitted to a host configured to perform a plurality of authentication steps to authenticate the biometric data; at least one of which is validated. These steps include reconstructing a biometric image with the biometric data, and extracting a swipe template from the biometric image.

In one embodiment, the swipe template is matched matching with an enrollment template. The enrollment template may have been encrypted during an enrollment process, in which case the authentication steps include decrypting the enrollment template. The extracted swipe template includes a series of minutiae. The sensor then receives a match parameter from the host and compares the enrollment template with the swipe template, using the match parameter.

In an alternate embodiment, the sensor receives the extracted swipe template from the host and matches the received swipe template with an enrollment template to produce a first result. Similarly, the host matches the swipe template with an enrollment template to produce a second result. The second result is received from the host and comparing with the first result to produce a comparison result. Credentials are released based on the comparison result.

In any of the above embodiments, release of credentials indicates successful validation and allows for access into the host. The credentials may include a decryption key configured to allow decryption of a data storage medium of the host.

In another embodiment, the sensor senses a biometric and retains a portion of the biometric data. The portion of the biometric data may be randomly selected and of a resolution lower than that of the biometric data transmitted to the host. The sensor transmits biometric data corresponding to the biometric to a host configured to perform a plurality of authentication steps to authenticate the biometric data, at least one of which is validated.

These steps may include reconstructing a biometric image with the biometric data and extracting a swipe template from the biometric image. The extracted swipe template may include a series of minutiae.

In one embodiment, validating includes receiving the biometric image, verifying similarity between the retained portion of the biometric data and a corresponding portion of the biometric image, discarding the portion of the biometric data, and retaining a section of the biometric image.

In another embodiment, validating may further include receiving the swipe template, verifying similarity between minutiae existing in the retained section of the biometric image and the series of minutiae of the swipe template, discarding the section of the biometric image, and retaining the swipe template. The swipe template is then matched with an enrollment template. If the enrollment template was previously encrypted during an enrollment process, it is decrypted while matching the swipe template. A match parameter is then received from the host and using to compare the enrollment template with the retained swipe template.

In any of the above embodiments, releasing of credentials indicates successful validation. The credentials may include a decryption key configured to allow decryption of a data storage medium of the host.

The invention comprises a system configured to authenticate and validate the authentication of biometric data received from a sensor to a host. The system may include a biometric sensor configured to sense a biometric from user and further configured to communicate biometric data corresponding to the biometric from a user. The host can be configured to receive the biometric data and to perform a plurality of authentication steps to authenticate the biometric data and also to verify the biometric sensor.

In one embodiment, the host is configured with a reconstruction unit configured to reconstruct a biometric image with the biometric data, a template unit configured to extract template from the biometric image, and a matching unit configured to match the template with an enrollment template to produce a second result. The biometric sensor may be configured to receive the extracted swipe template from the host and includes a matching unit configured to match the received swipe template with an enrollment template to produce a first result. The sensor may be further configured to receive the second result from the host and include a matching unit configured to compare the second result with the first result to produce a comparison result. In this embodiment, the system would be further configured to release credentials based on the comparison result to the host for validation.

In another embodiment, the system comprises a biometric sensor configured to sense a biometric and to communicate biometric data corresponding to the biometric and a host configured to perform a plurality of authentication steps to authenticate the biometric data. The biometric sensor includes a validation unit configured to validate at least one of the plurality of authentication steps.

The host may be configured to perform the plurality of authentication steps with a reconstruction unit configured to reconstruct a biometric image with the biometric data. The host may also include a template extraction unit configured to extract a swipe template, which may include a series of minutiae, from the biometric image and a matching unit configured to match the swipe template with an enrollment template. If the system includes an encryption unit configured to encrypt the enrollment template during an enrollment process, it would also include a decryption unit configured to decrypt the enrollment template.

In one embodiment, the validation unit is configured to receive a match parameter from the host and further includes a comparison unit configured to compare the enrollment template with the swipe template, using the match parameter.

In another embodiment, the biometric sensor is configured to receive the extracted swipe template from the host and further includes a template matcher configured to match the received swipe template with an enrollment template to produce a first result. The host also includes a template matching unit and is configured to perform the plurality of authentication steps performed by the host, including matching the swipe template with an enrollment template to produce a second result. The biometric sensor is configured to receive the second result from the host, and includes a comparator configured to compare the second result with the first result to produce a comparison result. The biometric sensor is configured to release credentials based on the comparison result to the host.

In another embodiment, the biometric sensor is configured to receive the extracted swipe template from the host and further includes a template matcher configured to match the received swipe template with an enrollment template to produce a first result. The host also includes a template matching unit and is configured to perform the plurality of authentication steps performed by the host, including matching the swipe template with an enrollment template to produce a second result. The biometric sensor is configured to receive the second result from the host, and includes a comparator configured to compare the second result with the first result to produce a comparison result. The biometric sensor is configured to release credentials based on the comparison result to the host.

In any of the above embodiments, release of credentials to the host indicates successful validation, allowing for access into the host by the biometric sensor. The credentials may include a decryption key configured to allow decryption of a data storage medium of the host.

In an alternative series of embodiments, the system comprises a biometric sensor configured to sense a biometric from a user and transmit biometric data corresponding to the biometric to a host configured to perform a plurality of authentication steps to authenticate the biometric data. The system includes storage configured to retain a portion of the biometric data and a validation unit configured to validate at least one of the plurality of authentication steps. The portion of the biometric data may be randomly selected by the biometric sensor or host and stored and may be of a resolution lower than that of the biometric data transmitted to the host. The validation unit may be configured to receive the biometric image, verify similarity between the retained portion of the biometric data and a corresponding portion of the biometric image and to discard the portion of the biometric data. and retain a section of the biometric image.

The authentication steps the host is configured to perform may include reconstructing a biometric image with the biometric data or extracting a template, which may include a series of minutiae, from the biometric image with an extraction unit. In the latter embodiment, validating further includes receiving the template, verifying similarity between minutiae existing in the retained section of the biometric image and the series of minutiae of the template, discarding the section of the biometric image, and retaining the template. The retained template matched with an enrollment template which, if encrypted during an enrollment process, is decrypted during matching.

Alternatively, validating may include receiving a match parameter from the host and comparing the enrollment template with the retained template using the received match parameter.

In any of the above embodiments, releasing of credentials indicates successful validation. The credentials may include a decryption key configured to allow decryption of a data storage medium of the host.

Referring to FIG. 2, one embodiment of the invention is illustrated that is one example where a sensor verifies all steps taken by a host. This example illustrates the applicability to a fingerprint sensor and system for use in conjunction with a host, such as a processor used in a laptop computer for example. Again, the reference to a fingerprint sensor is merely illustrative, any type of biometric sensor may be used depending on the application. Still referring to FIG. 2, according to the invention, one or more of these verifications can be implemented to improve the security of a fingerprint sensor. The invention is not limited to this embodiment, but provides a novel and useful device, system and method for better securing a fingerprint sensor or other biometric device. Moreover, the invention is not limited to any particular type of device, but rather extends to any device, system or entity that would be improved by enhanced security configurations and protocols. For example, ignition systems in automobiles may be improved by such security to avoid unauthorized replacement by car thieves. The invention would substantially minimize misuse of potentially dangerous systems that require authorized access such as fuel storage, power generators, or facilities that have restricted access for safety purposes. Or, a manufacturer may simply want to restrict connection with incompatible or otherwise unauthorized peripheral equipment or component replacement.

In this implementation, the sensor 200 validates every step of the process on the host 220. Again, the invention is not limited to a system that validates each and every step of the validation process, but extends to any single authorization configured in such a system.

In this example, initially, the sensor 200 collects raw fingerprint data 202 from the user, and sends it to a host 220, such as a processor, logic circuitry, or related circuitry in a laptop, desktop, mobile telephone, or other device or system. According to one embodiment of the invention, the sensor 200 may also retain a section 204 of the raw fingerprint data 202 based on predetermined criteria. In a further embodiment, this section 204 may be randomly selected for increased security. Alternatively, the sample may even be a lower resolution than the data reported to the host to minimize the amount of memory needed on the sensor 200.

The host 220 may perform Image Reconstruction at step 222 in the case of a biometric or fingerprint sensor, where the host 220 processes the raw fingerprint 202 to create a standardized fingerprint image 212. This reconstructed image 212 is sent back to the sensor 200, which may verify that the section 204 of raw image that it stored is similar to the same section 214 of the reconstructed image 212. The reconstructed image 212 may be annotated with raw line numbers or other parameters to aid the sensor 200 in identifying the section 214 corresponding to the stored section 204 of raw image. If the sections are similar, the section 204 of raw image may be discarded, and the sensor 200 may select a section 216 of the reconstructed image. Similar to the example above, this section 216 may be randomly selected for improved security, and may be of a lower resolution than the data reported to the host to minimize the amount of memory needed.

The host 220 may then perform Template Extraction at step 224, which reduces the fingerprint to a series of minutiae or other generally accepted template formats. The extracted swipe template 218 including this series of minutiae may be sent to the sensor 200 to verify all minutiae that exist within the section 216 of reconstructed image it had previously stored. The template 218 may be sent, for example, with annotations of line numbers and pixel positions (e.g., Minutiae #1 on reconstructed image line 112 at pixel 27). For example, the verification may include matching the minutiae points with discontinuities in the section 216 of the reconstructed image. In one embodiment, if the template 218 is verified, the sensor 200 may discard the section 216 of reconstructed image, and store a section of the swipe template 218 in memory. In one embodiment, if the template is exceptionally large for a particular configuration, or if memory space is limited, the entire template may not be stored, and a portion or section of the template may be stored.

According to an embodiment of the invention, the host 220 may then perform the match function at step 226. In one embodiment, an enrollment template may be a template corresponding to a user fingerprint for purposes of comparison to later swipes. The enrollment template may be previously stored at "enrollment time," or the stage at which the system is initiated by, for example, the rightful user. The enrollment template may be encrypted by the sensor at enrollment time, and then may be decrypted by the sensor 200 when the match function 226 is occurring. This embodiment would allow the sensor 200 to store the enrollment template with significantly reduced likelihood that an attacker could access the template without authorization.

Once the host 220 finds an acceptable match, the swipe template may be passed back to the sensor 200 at step 228. Optionally, match parameters (rotation/translation/matching minutiae) may also be passed with the swipe template, so as to allow for a simplified matcher embedded within the sensor, as well as a reduction in memory required for supporting the matcher. The sensor 200 may then have both the extracted template 218 and decrypted template 240 in memory, and the match verification process at step 242 may match parameters from the host 220. Once the match is verified, the sensor may release credentials 246 at step 244 that allow the system to continue.

Credentials, as used here, can mean any one of a number of types of data. Preferably, the credential should be a piece of data that is critical to the computer system proceeding. This could be a username/password pair, where the system would be unable to continue a login process without the sensor releasing them. The credential could also be something like a decryption key, for example a key necessary to decrypt the computer systems hard disk. If the sensor does not release such a key, it is impossible for the system to proceed. This eliminates many types of attacks on a secure system, as there is no simple check that can be bypassed.

In this embodiment, simple attacks that allow circumvention of the fingerprint security system are substantially reduced. In one embodiment, every major step in the software process of the fingerprint match process may be verified by the fingerprint sensor in order to complete the validation process.

The host and sensor may include any combination or subset of the above components, which may be arranged and configured in the manner most appropriate for the system's intended application.

FIG. 3 illustrates another example, a less comprehensive implementation that can be utilized in systems and devices for enhanced security. In this example, the fingerprint sensor 300 is configured to transmit raw fingerprint data 302 to the host 320. The host 320 may then perform Image Reconstruction at step 322, which processes the raw fingerprint 302 to create a standardized fingerprint image. The host 320 may then perform Template Extraction at step 324 to reduce the fingerprint image to a small series of minutiae or other generally accepted template format.

The host 320 may then perform the match function at step 326. In one embodiment, the enrollment template may have been encrypted by the sensor 300 during an enrollment process, and then decrypted by the sensor 300 when the match function 326 is occurring. This embodiment would allow the sensor 300 to store the enrollment template to provide a significantly reduced likelihood that an attacker could access the template without authorization. Once the host 320 finds an acceptable match, the extracted swipe template and, optionally, match parameters (rotation/translation/matching minutiae) may be passed back to the sensor at step 328. The sensor 300 then has both templates in memory, and the match verification process at step 342 can be done using the match parameters from the host 320. Once the match is verified, the sensor 300 may release credentials 346 at step 344 that allow the system to continue operations, the access being verified.

The host and sensor may include any combination or subset of the above components, which may be arranged and configured in the manner most appropriate for the system's intended application.

FIG. 4 illustrates yet another embodiment of the invention. In this example, the fingerprint sensor 400 is configured to transmit raw fingerprint data 402 to the host 420. The host 420 may then perform Image Reconstruction at step 422, which processes the raw fingerprint 402 to create a standardized fingerprint image. The host 420 may then perform Template Extraction at step 424 to reduce the fingerprint image to a small series of minutiae or other generally accepted template format.

The host 420 may then transmit the extracted swipe template 418 to the sensor 400. The sensor 400 may then perform the match function at step 442 based on extracted swipe template 418 and enrollment template 440, to which the sensor 400 has access. In one embodiment, host 420 may be prevented from accessing enrollment template 440, amongst other stored enrollment templates, all of which swipe template 418 may be required to be matched against. In one embodiment, the enrollment template 440 may have been encrypted by the sensor 400 during an enrollment process, and then decrypted by the sensor 400 when the match function 442 is occurring. This embodiment would allow the sensor 400 to store the enrollment template with a significantly reduced likelihood that an attacker could access the template without authorization.

Once the sensor 400 finds an acceptable match at step 442, credentials 446 may be released from sensor 400 to host 420 at step 444. Credentials 446 may include, for example, a token that may be employed in continued operations, such as in verification of the match at a higher level. The credentials may include a key which allows decryption of the system boot disk. Hence, without the necessary credentials, an attacker will be unable to move forward with the attempted intrusion.

In this embodiment, only one extracted template may be provided by the host 420 per one physical fingerprint swipe. This may thus eliminate software-based attacks on the system, since a swipe is required for each attempt. Remote attacks may also be eliminated. Such a configuration requires a physical swipe each time, and thus a user trying to breach a system or device would not be able to do so remotely via internet. In this embodiment, the host 420 software may never access the templates, since the storage of the templates is controlled by sensor 400 itself, and not the host 420. This provides an extra level of security; even should the host be compromised, the templates may not be easily accessible. According to the invention, this embodiment is not limited to the embodiment illustrated in FIG. 4, and can be employed in other embodiments of the invention in order to increase security.

However, a disadvantage of this embodiment is that it may require the sensor 400 to perform matching against all of the enrollment templates 400. It may also require the sensor to include a high-quality matching mechanism, thus potentially resulting in increased cost of manufacture.

An additional disadvantage is that rogue software could provide a bad template to the sensor at 418 that the sensor would not be able to detect. Fortunately, even low quality matcher systems may exhibit False Accept Rates of 1 in 1000, making a successful attack on the system unlikely.

The host and sensor may include any combination or subset of the above components, which may be arranged and configured in the manner most appropriate for the system's intended application.

Figure 5A:
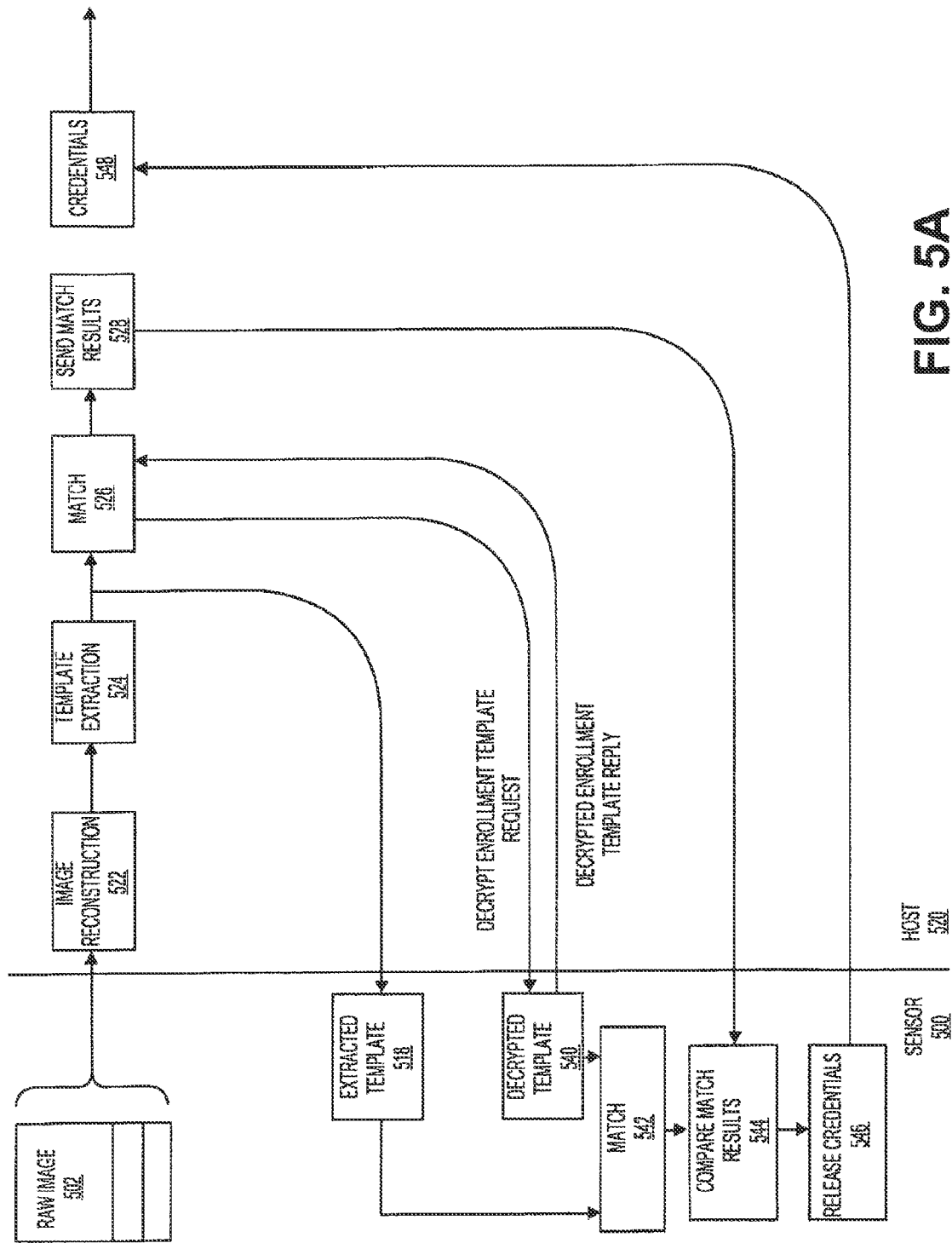
FIG. 5A illustrates another embodiment of the invention.

FIG. 5A illustrates another embodiment of the invention. In this example, the fingerprint sensor 500 is configured to transmit raw fingerprint data 502 to the host 520. The host 520 may then perform Image Reconstruction at step 522, which processes the raw fingerprint 502 to create a standardized fingerprint image. The host 520 may then perform Template Extraction at step 524 to reduce the fingerprint image to a small series of minutiae or other generally accepted template format. The host 520 may then transmit the extracted swipe template 518 to the sensor 500.

The host 520 may then perform the match function at step 526. In addition, the sensor 500 may also perform the match function at step 542 based on extracted swipe template 518 and enrollment template 540. Host 520 and sensor 500 may both be required to perform matching of extracted swipe template 518 against all enrollment templates, including enrollment template 540. In one embodiment, the enrollment template 540 may have been encrypted by the sensor 500 during an enrollment process, and then decrypted by the sensor 500 when the match function at steps 526/542 is occurring. This embodiment would allow the sensor 500 to store the enrollment template with significantly reduced likelihood that an attacker could access the template without authorization.

For each enrollment template that extracted swipe template 518 is matched against, the result of the match function at step 526 will be sent from host 520 to sensor 500 via the Send Match Results module 528 of the host 520 to the Compare Match Results module 544 of sensor 500. This host match result will be compared, at step 544, to the corresponding sensor match result from step 542. Once the match comparison results are determined at step 544, credentials 548 may be released from sensor 500 to host 520 at step 546. As an example, credentials 548 may vary depending on the match comparison results:

| Sensor Result | Host Result | Credentials |
|---|---|---|
| Yes | Yes | Match (with token indicating verification) |
| Yes | No | No match (with token indicating a possible denial of service) |
| No | Yes | No match (with token indicating a possible entry attack) |
| No | No | No match |

The Sensor-No, Host-Yes set of credentials may be useful in alerting the system of an attempted security compromise. Denial of Service may mean that possibly someone has corrupted the matcher on the host to always answer "No". Thus, the attack is configured to deny the rightful user access to the computer. The wording is meant to convey the possibility of providing the user another try, or prohibiting more tries. In a practical system, the number of tries by a user can be set to a finite minimum. For the "No Match", the scenario is slightly different. Here, someone may have corrupted the matcher on the host to always return "Yes". Thus, the attack allows an unauthorized person access to the computer.

This embodiment alternatively allows for a simplified version of the matcher on the sensor. That is, the sensor's match function may be used as only a check on the host match function. For example, the system may be configured such that the final determination errs toward, and does not reject, the sensor's result. With such a configuration, host 520 may first perform the match function on all templates at 526, and then indicate to sensor 500 the matched template. Sensor 500 may then access the host-matched template from its storage, and verify the match. The sensor match result will then take priority, as seen in the table below:

| Sensor Result | Host Result | Credentials |
|---|---|---|
| Yes | Yes | Match (with token indicating verification) |
| No | Yes | No match (with token indicating a possible entry attack) |
| X | No | No match |

An advantage of this embodiment is that the sensor need only check a single template, the one indicated as a match by the host. However, there is no check on a "denial of service" attack.

One possible disadvantage of the embodiments described above in relation to FIG. 5 is that all templates are provided to the host. In some applications, this may allow for security holes, should the host be compromised. The embodiments described above in reference to FIGS. 4 and 5 may be less taxing on the host than, for example, the configuration shown in FIG. 2, but may also provide a lower level of security. Alternative embodiments are described below to overcome this potential disadvantage.

Figure 5B:
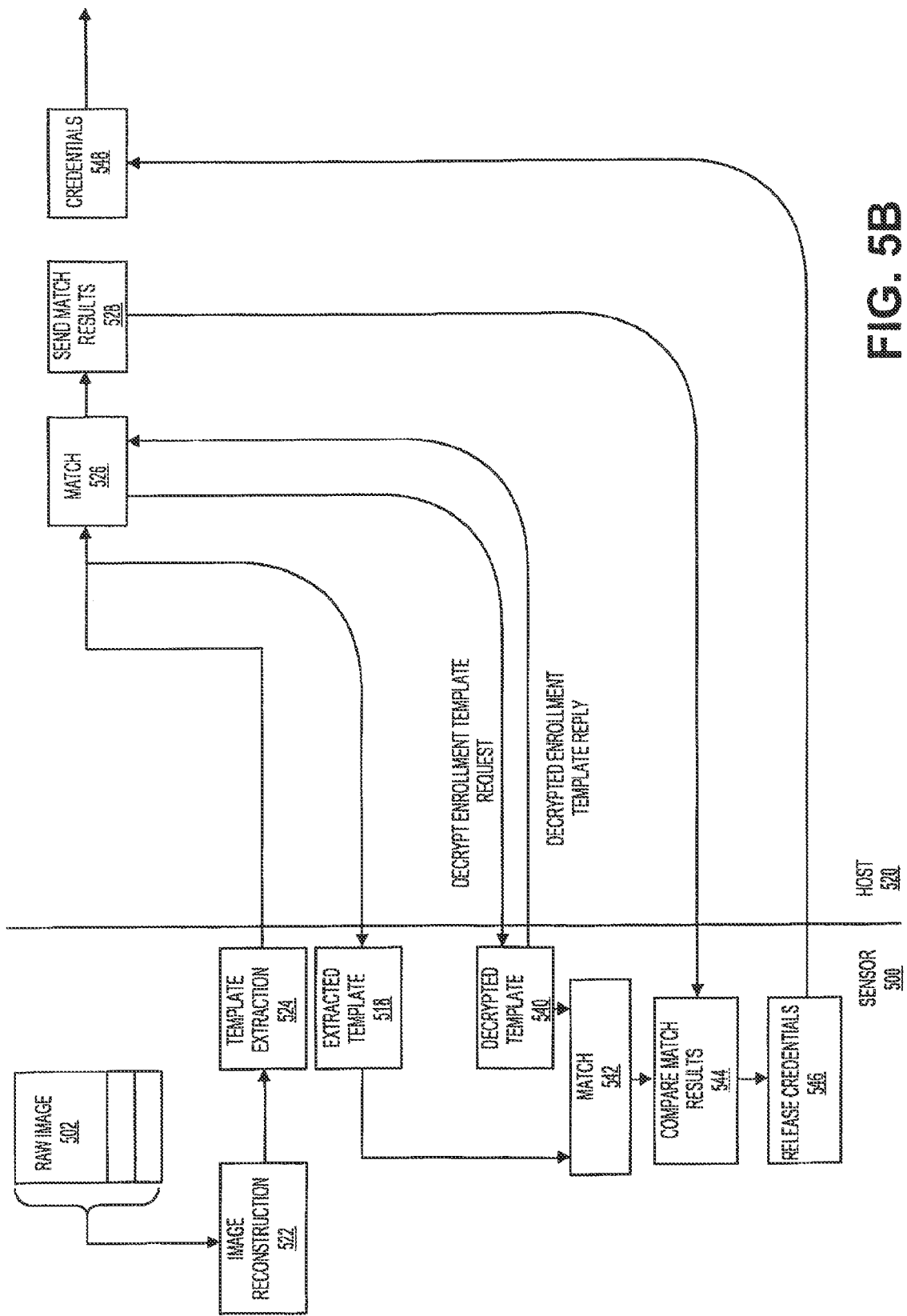
FIG. 5B illustrates another embodiment of the invention.

FIG. 5B illustrates an embodiment of the invention in which the image reconstruction step 522 and template extraction step 524 are performed by the sensor instead of the host. An advantage of this embodiment is that it allows for a client-server implementation in which the sensor is located at a client device while the host is located at a remote server location and connected to the client via IP networking In such an implementation, it is desirable to minimize or eliminate the transmission of raw image data from host to sensor to preserve security. The embodiment illustrated in FIG. 5B is identical to that of FIG. 5A in all other respects.

The host and sensor may include any combination or subset of the above components, which may be arranged and configured in the manner most appropriate for the system's intended application.

Figure 6A:
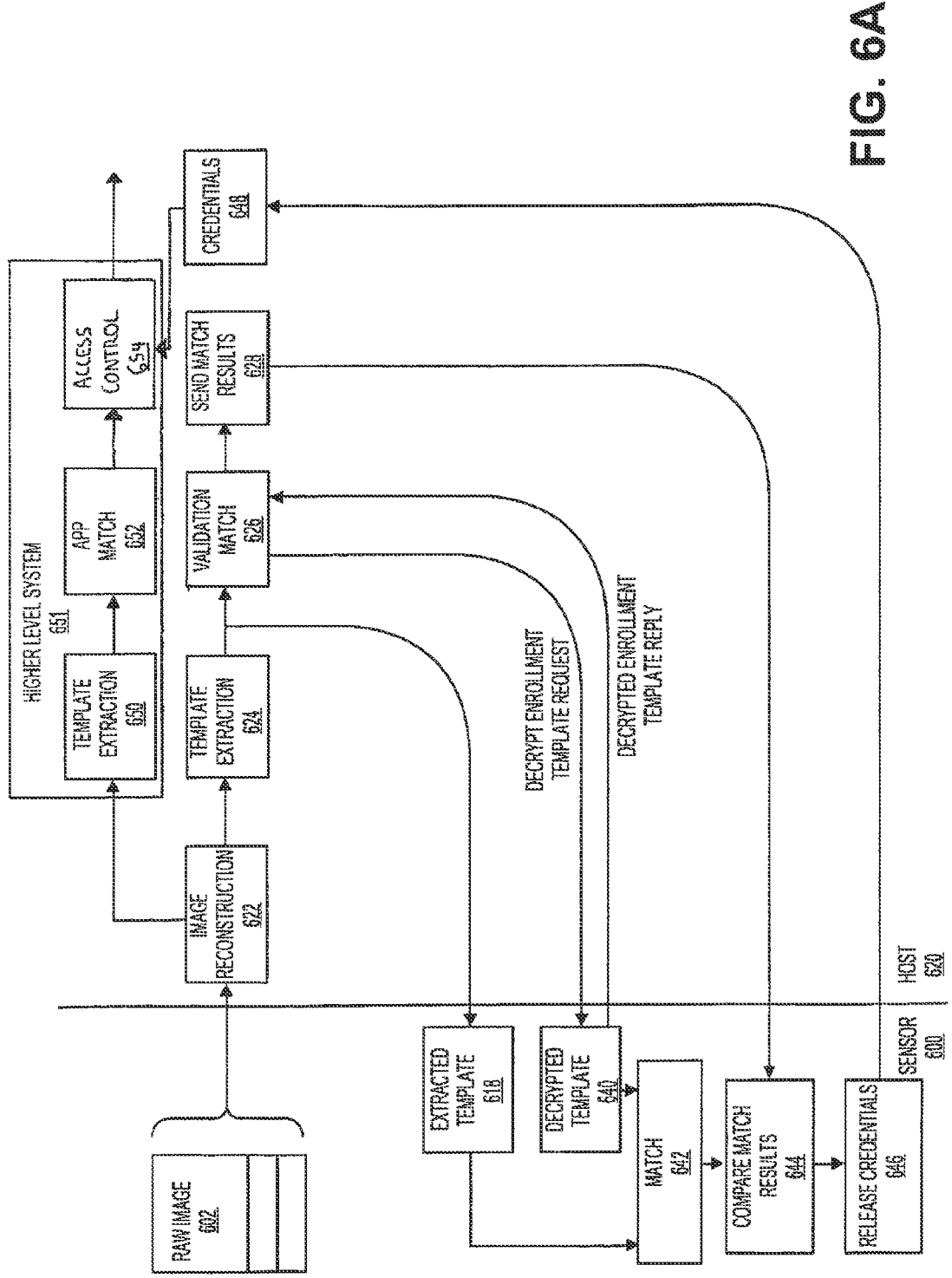
FIG. 6A illustrates another embodiment of the invention.

Another embodiment of the invention may include an additional configuration at the system level. This additional configuration may include an additional matcher at a higher level than the host 620, and may be incorporated with various embodiments of the invention, such as those described above. For example, FIG. 6A illustrates this additional system-level configuration in conjunction with the embodiment described with reference to FIG. 5. According to the invention, the configuration of FIG. 6A provides increased security in the system by performing matching in both locations. As seen in FIG. 6A, the fingerprint sensor 600 is configured to transmit reconstructed fingerprint data 622 to the host 620. The host 620 will validate the fingerprint through the release of credentials 648 by following the sequences described for FIG. 5A. The host 620 will then transmit the reconstructed fingerprint image 622 and credentials 648 to the higher level system 651, which can then decide whether to allow access or not, through Access Control 654.

This embodiment would typically be used in a large system such as banking, credit card processing, enterprise level businesses, and other systems so configured. This has advantages of reducing processing load on the higher level by using the host 620 to screen out false matches. This embodiment also increases security and flexibility by allowing the App Match 652 to be different, perhaps more sophisticated, and not necessarily data compatible, with the Validation Match 626.

Figure 6B:
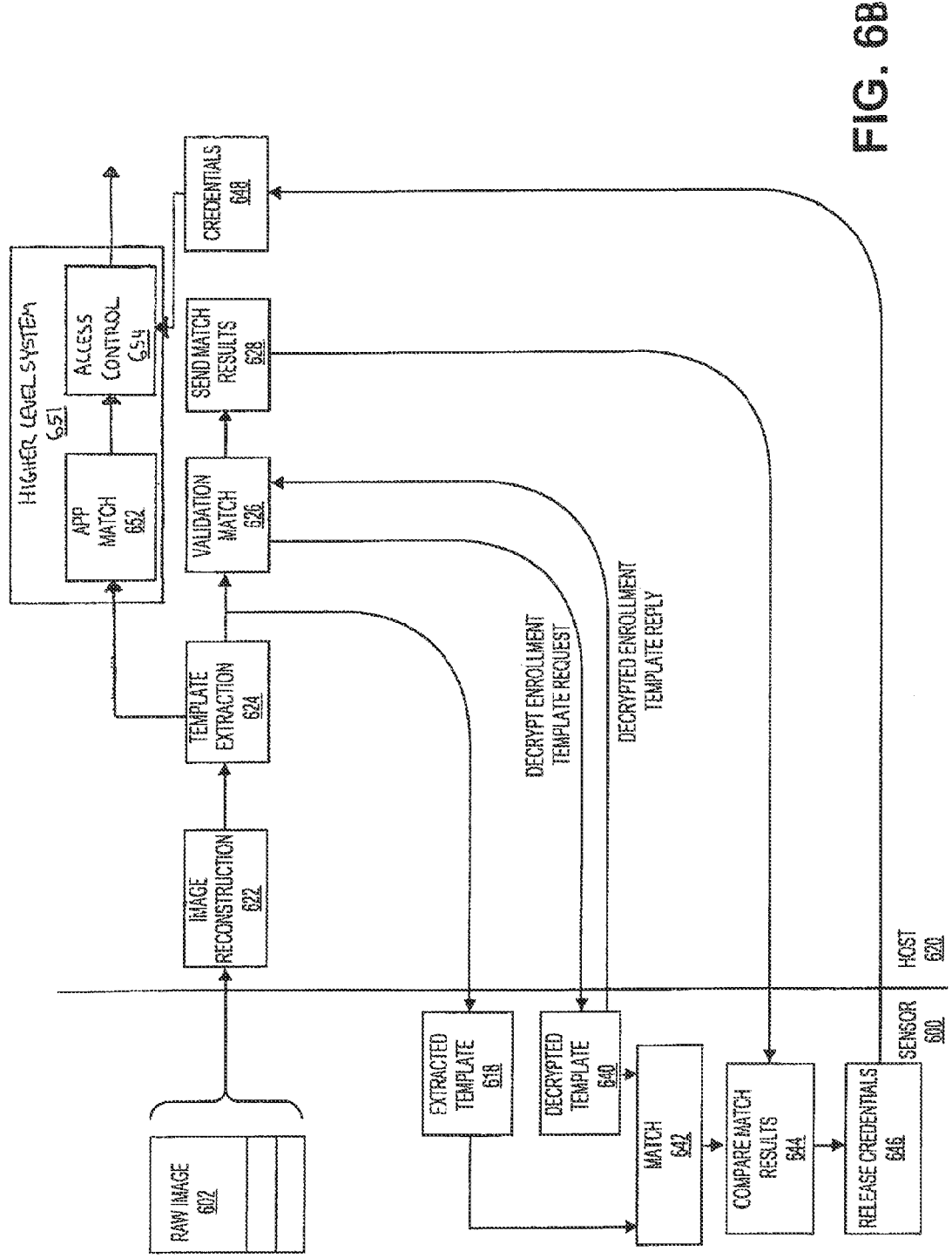
FIG. 6B illustrates another embodiment of the invention.

FIG. 6B illustrates an alternative embodiment using the higher level system. With this embodiment, the main difference is that the host 620 sends template data 624 to the higher level system. This can substantially reduce the data transmission requirements. In one example, it could be reduced by a factor of up to 100 or even more. The reduction in data transmission requirements may be at the expense of requiring that App Match 652 be compatible with Validation Match 626.

The host and sensor may include any combination or subset of the above components, which may be arranged and configured in the manner most appropriate for the system's intended application.

Figure 7A:
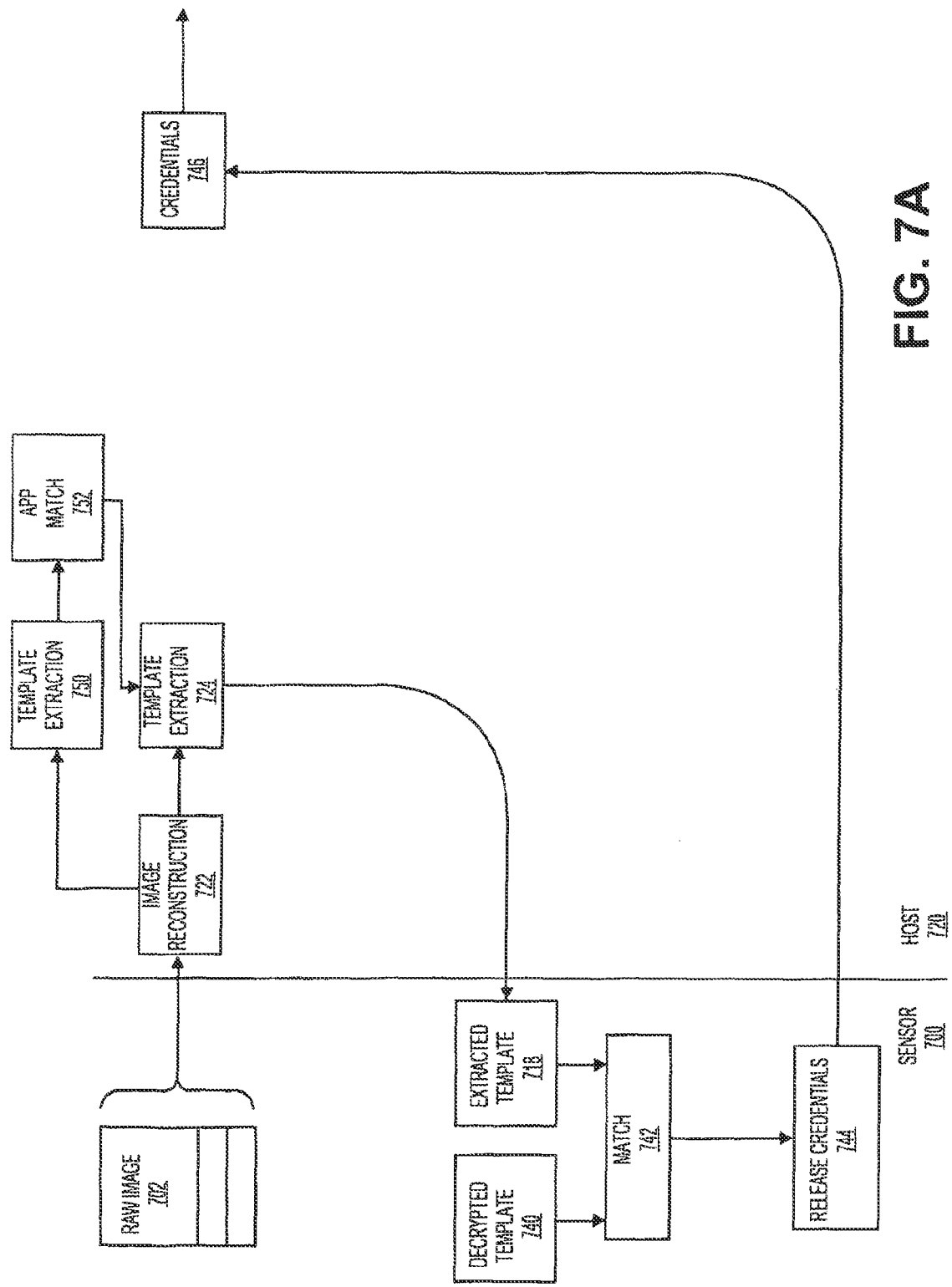
FIG. 7A illustrates another embodiment of the invention.
Figure 7B:
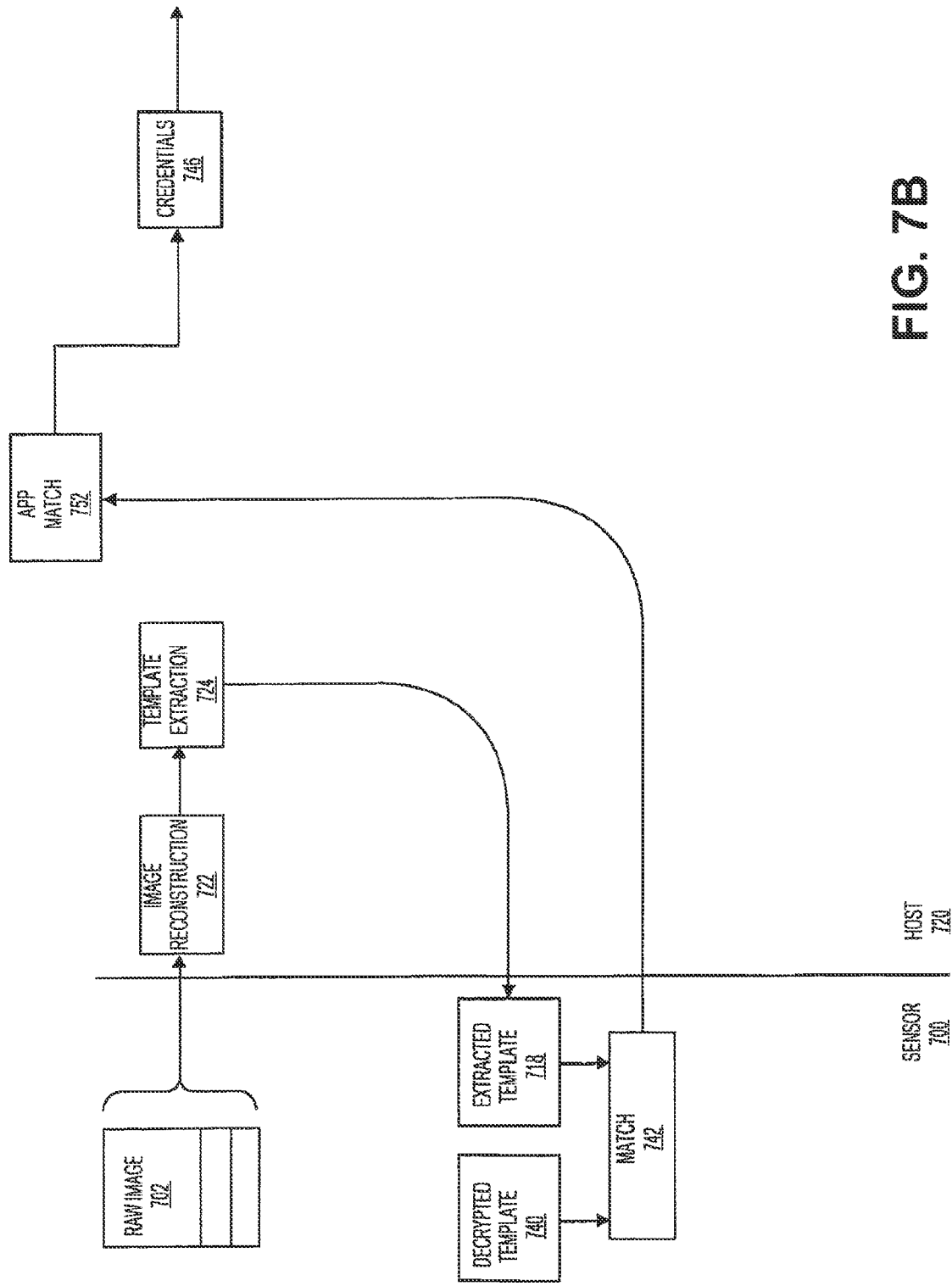
FIG. 7B illustrates another embodiment of the invention.

Another example of this additional system-level configuration, as incorporated with the embodiment of FIG. 4, is illustrated in FIG. 7. In this example, after Image Reconstruction 722 of Raw Image 702, the first Template Extraction 750 takes place and proceeds to APP-Match 752.

If a match is found at APP-Match 752, the validation process will move forward to the second Template Extraction 724, which takes place independently of Template Extraction 750. As in the embodiment of FIG. 4, the host 720 may transmit the extracted swipe template 718 to the sensor 700. The sensor 700 may then verify the match at step 742 based on extracted swipe template 718 and enrollment template 740. If sensor 700 successfully verifies the match, credentials 746 may be released from sensor 700 to host 720 at step 744. Credentials 746 may include, for example, a token that may be employed in continued operations, such as in verification of the match at a higher level.

The additional system-level configuration disclosed above is not limited to those embodiments described with reference to FIGS. 6 and 7. This extra-matcher configuration may be incorporated with various other embodiments of the invention. It is also possible to have separate Template Extraction and/or matchers at each location, so that the host and sensor may have different and separate processes and/or hardware for matching. Thus, the matcher does not need to be the same in both locations, and, in practice, there is no standardization requirement in this regard.

Also, because the local system has access to the host system, all templates may need not be maintained locally. This has significant practical advantages in both memory on the local machine as well as making sure the local machine has all of the latest templates it might need. Thus, the invention provides further flexibility for the configured devices and systems. This approach also reduces the number of possible matches on the System level. Only the templates known to the local machine need to be checked at the System level. In practice, in a larger Enterprises (such as IBM or Microsoft), this is a significant reduction. Furthermore, host assistance, as illustrated in FIGS. 2-5 and described above, can still take place, in addition to the separate system match.

Also, according to a device or system configured according to the invention, the general concept embodied in a device configured according to the invention is that ONE swipe produces ONE valid total match attempt. The sensor substantially guarantees that the swipe was from a valid stored template. Even if an alternate image is provided to the system, the Sensor Match will fail, unless the finger matches the stored template. Also, when the System concept is involved, credentials are released to the System, not the local PC.

Figure 8A:
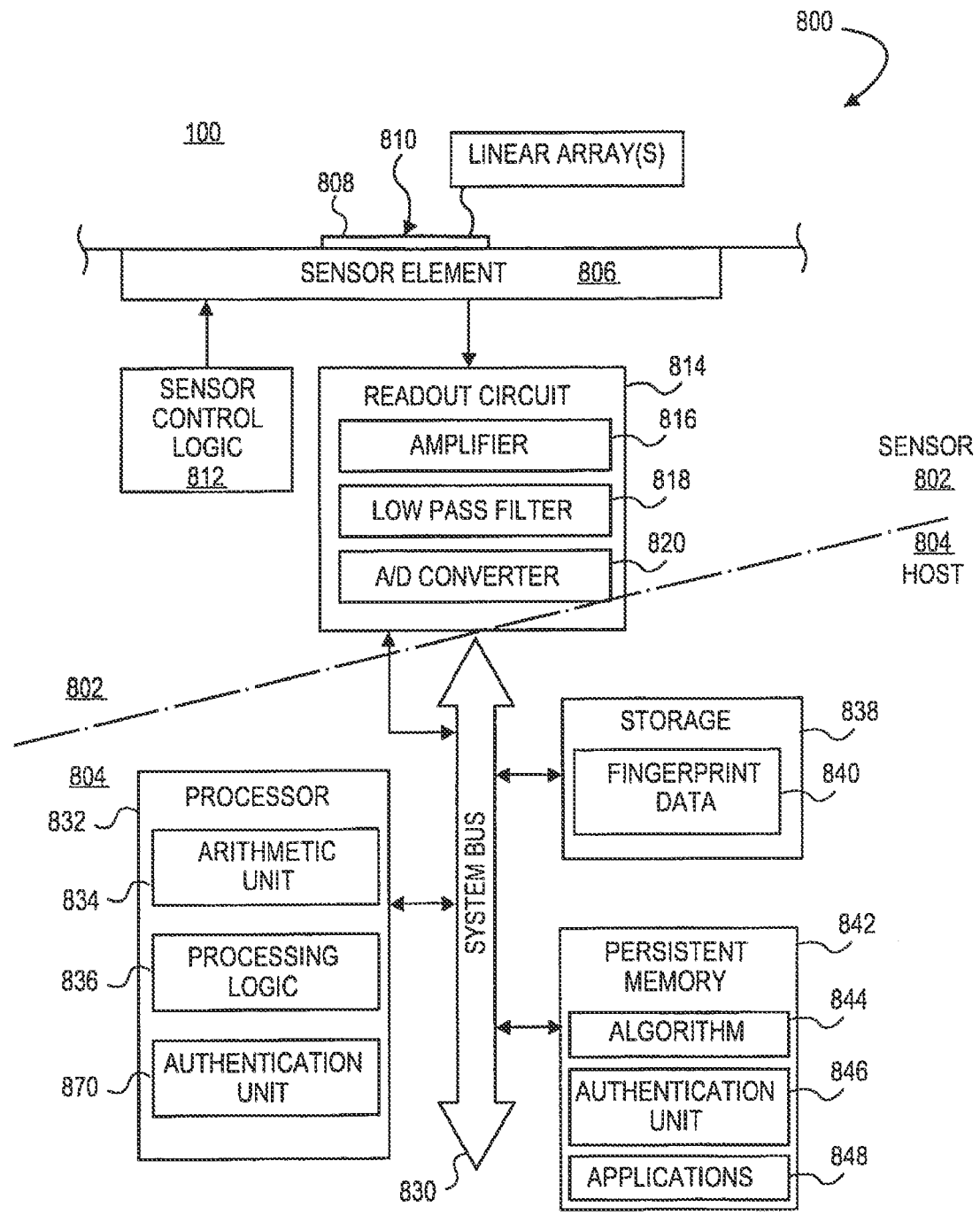
FIG. 8A illustrates another embodiment of the invention.

Referring to FIG. 8A, a diagrammatic view of a sensor 802/Host 804 system 800 configured according to the invention is illustrated. The device includes a linear array that may be configured for receiving a fingerprint sensor, but may be any type of biometric sensor, such as described in the embodiments above, and also includes a sensor element 806 also discussed above. The device further includes sensor control logic 812 configured to control the basic operations of the sensor element. The exact operations of the sensor element governed by the sensor logic control greatly depends on a particular sensor configuration employed, which may include such as power control, reset control of the pixels or data contact points, output signal control, cooling control in the case of some optical sensors, and other basic controls of a sensor element. Sensor controls are well known by those skilled in the art, and, again, depend on the particular operation. The device further includes a readout circuit 814 for reading analog output signals from the sensor element when it is subject to a fingerprint juxtaposed on the sensor surface 810. The readout circuit includes an amplifier 816 configured to amplify the analog signal so that the it can more accurately be read in subsequent operations. Low pass filter 818 is configured to filter out any noise from the analog signal so that the analog signal can be more efficiently processed. The readout circuit further includes an analog to digital converter 820 that is configured to convert the output signal from the sensor element to a digital signal that indicates a series of logic 0's and 1's that define the sensing of the fingerprint features by the pixels or data contact points of the sensor surface 810. Such signals may be separately received by the motion sensors and the fingerprint sensing surfaces as discussed in the embodiments above, and may be read out and processed separately. The readout circuit may store the output signal in storage 838, where fingerprint data (or other biometric data in other biometric sensor enabled systems) 840 is stored and preserved, either temporarily until the processor 832 can process the signal, or for later use by the processor. The processor 832 includes arithmetic unit 834 configured to process algorithms used for sensor and host related operations, such as that described above, such as for reconstruction of fingerprints or other biometric data, depending on the application. Processing logic 836 is configured to process information and includes analog to digital converters, amplifiers, signal filters, logic gates (all not shown) and other logic utilized by a processor. Persistent memory 842 is used to store algorithms 844, authentication unit or software or logic module 846, and software applications 848 that are used by the processor for the various functions described above, and in more detail below. The system bus 830 is a data bus configured to enable communication among the various components in the system 800.

The host and sensor may include any combination or subset of the above components, which may be arranged and configured in the manner most appropriate for the system's intended application.

Figure 8B:
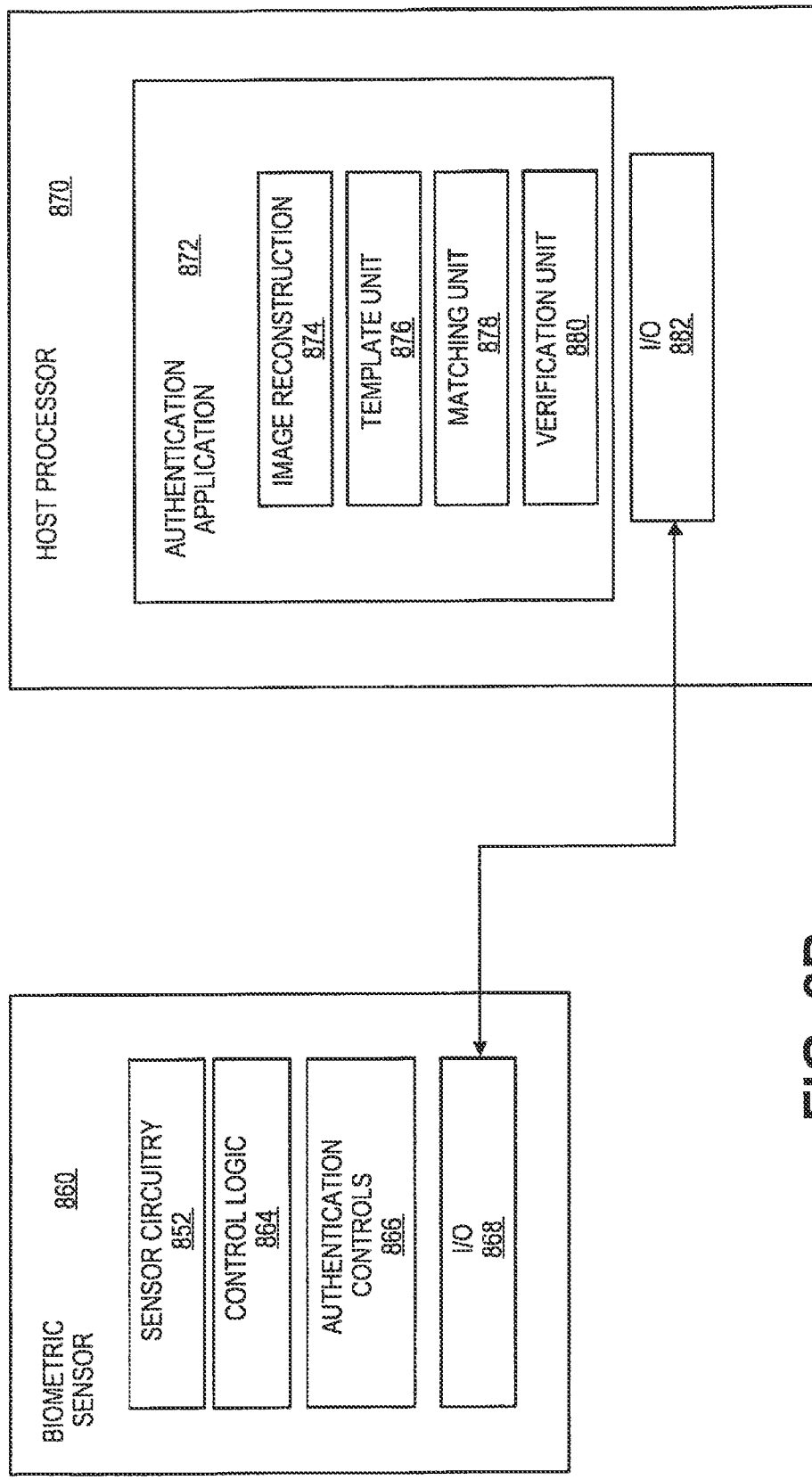
FIG. 8B illustrates another embodiment of the invention.

Referring to FIG. 8B, another diagrammatic view of a sensor/host system is illustrated, showing a biometric sensor 860 communicating with a host processor 870. In this embodiment, a biometric sensor 860 includes sensor circuitry 852 and control logic 864 that may be a dedicated microprocessor or logic circuitry for controlling the operations of the sensor. According to the invention, authentication controls 866 perform the plurality of authentication steps described in each of the embodiments discussed above. Data is sent to and received from the host processor via I/O apparatus 868. The host processor includes authentication application 872 and I/O apparatus 882. The authentication application is comprised of an image reconstruction unit 874, a template unit 876, a matching unit 878, and a verification unit 880. These units respectively perform the image reconstruction, template extraction, matching, and verifications functions described in the embodiments discussed above. The host processor further includes an I/O unit 868, which receives and transmits data to the biometric sensor via the analogous I/O unit 868 included in the biometric sensor.

Figure 8C:
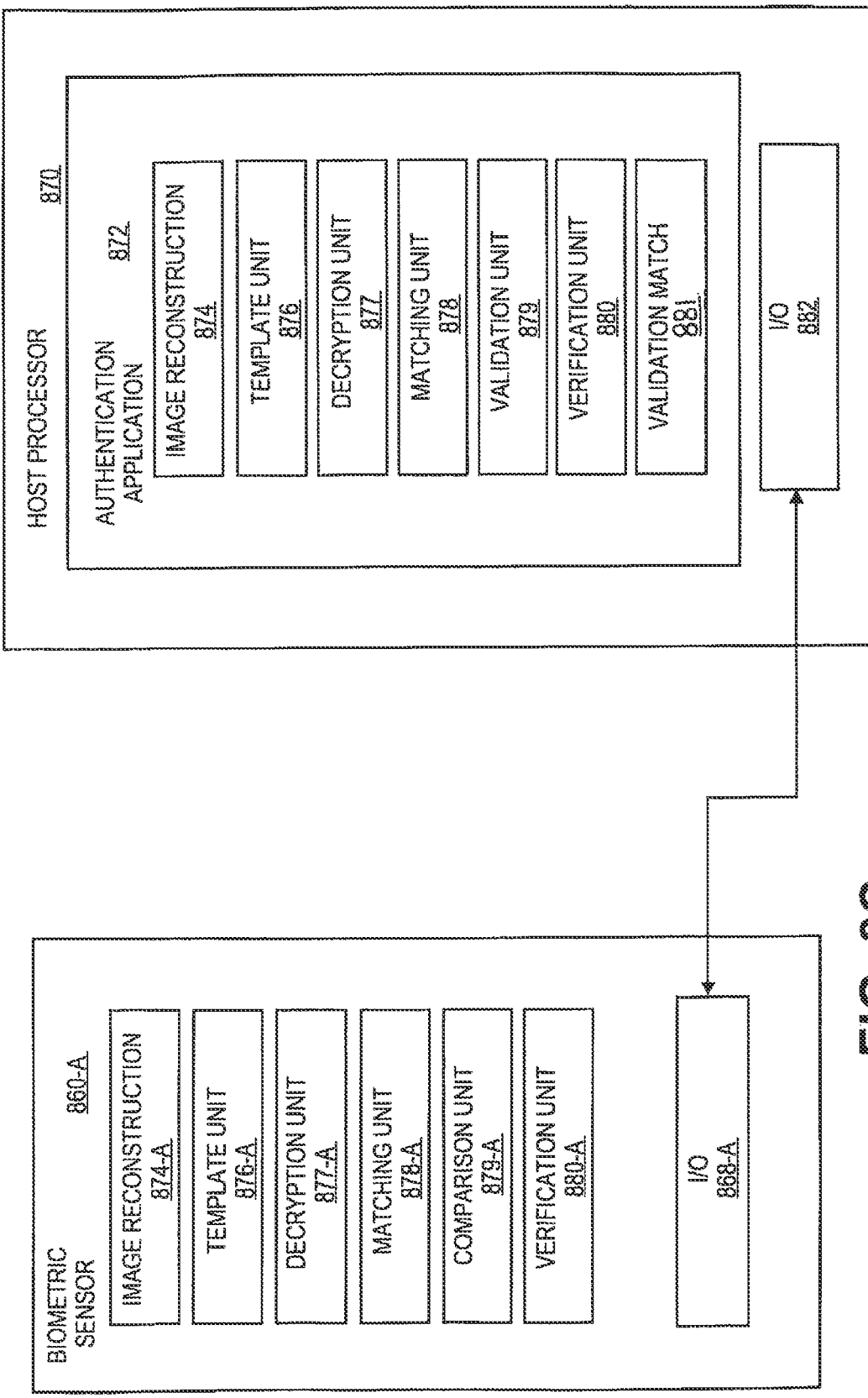
FIG. 8C illustrates another embodiment of the invention.

Referring to FIG. 8C, yet another diagrammatic view of a sensor/host system is illustrated, showing a biometric sensor 860-A communicating with a host processor 870, but with different features. According to the series of embodiments that employ the illustrated system, the different operations needed to authenticate are performed both within the host. The biometric sensor includes an image reconstruction unit 874-A, a template unit 876-A, a decryption unit 877-A, a matching unit 878-A, a comparison unit 879-A, and a verification unit 880-A. Analogous components included in the host processor—namely, an image reconstruction unit 874, a template unit 876, a decryption unit 877, a matching unit 878, and a verification unit 880—together with the validation unit 879 and validation match unit 881 collectively comprise the authentication application 872. The analogous units on the biometric sensor and host processor respectively perform the image reconstruction, template extraction, template decryption, matching, and verification steps described in the embodiments discussed above. The comparison unit 879-A performs comparisons between the enrollment template and the swipe template using the match parameter received from the host. The comparison unit 879-A also performs comparisons between the first and second results produced by comparing the enrollment template and the swipe template. The validation unit 879 performs the functions that comprise validation of one or more of the authentication steps described in the embodiments discussed above. In embodiments that employ a higher level matcher (as in FIG. 6A) the validation match unit 881 performs the host-level matching procedure. Data is transmitted between the sensor and the host by the IO unit 868-A on the sensor and its analogous component 882 on the host processor.

The host and sensor may include any combination or subset of the above components, which are arranged and configured in the manner most appropriate for the system's intended application.

Again, the invention has application in many areas, particularly in biometric sensors. Fingerprint sensors, for example, and other biometric sensors are gaining increasing acceptance for use in a wide variety of applications for security and convenience reasons. Devices, systems and methods configured according to the invention will have improved security of the biometric verification process without increasing the cost of the system. Furthermore, the invention may extend to devices, systems and methods that would benefit from validation of components. As discussed above, the invention includes the ability for the host and sensor to include any combination or subset of the above components, which may be arranged and configured in the manner most appropriate for the system's intended application. Those skilled in the art will understand that different combinations and permutations of the components described herein are possible within the spirit and scope of the invention, which is defined by the appended claims, their equivalents, and also claims presented in related applications in the future and their equivalents.

The invention may also involve a number of functions to be performed by a computer processor, such as a microprocessor. The microprocessor may be a specialized or dedicated microprocessor that is configured to perform particular tasks according to the invention, by executing machine-readable software code that defines the particular tasks embodied by the invention. The microprocessor may also be configured to operate and communicate with other devices such as direct memory access modules, memory storage devices, Internet related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention.

Within the different types of devices, such as laptop or desktop computers, hand held devices with processors or processing logic, and also possibly computer servers or other devices that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such computers for maintaining information that is frequently retrieved by the central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. During data storage and retrieval operations, these memory devices are transformed to have different states, such as different electrical charges, different magnetic polarity, and the like. Thus, systems and methods configured according to the invention as described herein enable the physical transformation of these memory devices. Accordingly, the invention as described herein is directed to novel and useful systems and methods that, in one or more embodiments, are able to transform the memory device into a different state. The invention is not limited to any particular type of memory device, or any commonly used protocol for storing and retrieving information to and from these memory devices, respectively.

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present invention. The machine-readable medium includes any mechanism that provides (i.e., stores and/or transmits) information in a form readable by a machine (e.g., a computer, PDA, cellular telephone, etc.). For example, a machine-readable medium includes memory (such as described above); magnetic disk storage media; optical storage media; flash memory devices; biological electrical, mechanical systems; electrical, optical, acoustical or other form of propagated signals (e.g., carrier waves, infrared signals, digital signals, etc.). The device or machine-readable medium may include a micro-electromechanical system (MEMS), nanotechnology devices, organic, holographic, solid-state memory device and/or a rotating magnetic or optical disk. The device or machine-readable medium may be distributed when partitions of instructions have been separated into different machines, such as across an interconnection of computers or as different virtual machines.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Accordingly, the specification and drawings are to be regarded in an illustrative rather than a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The methods, systems and devices include improved security operations and configurations with a novel approach to securing components such as biometric systems. Such systems would greatly benefit from increased security features, particularly in financial transactions. Although this embodiment is described and illustrated in the context of devices, systems and related methods of validating biometric devices such as fingerprint sensors, the scope of the invention extends to other applications where such functions are useful. Furthermore, while the foregoing description has been with reference to particular embodiments of the invention, it will be appreciated that these are only illustrative of the invention and that changes may be made to those embodiments without departing from the principles of the invention, the scope of which is defined by the appended claims and their equivalents.

What is claimed is:

1. A system, comprising:
    a biometric sensor that senses a biometric image of a biometric of a user and transmits biometric data corresponding to the biometric image to a host computing device and to receives from the host computing device authentication information relating to results of the host computing device performing a plurality of authentication steps on the biometric data to authenticate the user as identified by the biometric data, wherein the plurality of authentication steps comprises producing a first result at the host computing device by comparing a template extracted by the host computing device from a first portion of the biometric data to a stored template stored by the host computing device;
    a memory, at the biometric sensor, that retains a second portion but not all of the biometric data; and
    a processor, at the biometric sensor, configured to validate at least one and not all of the plurality of authentication steps performed by the host computing device, utilizing the authentication information received by the biometric sensor from the host computing device by comparing a template extracted by the biometric sensor from the second portion of the biometric data retained by the biometric sensor and corresponding to the first portion utilized by the host computing device, to produce a second result, and comparing by the biometric sensor the first result with the second result.

2. The system of claim 1, wherein the second portion of the biometric data is randomly selected for retention by the biometric sensor.

3. The system of claim 1, wherein the second portion of the biometric data is randomly selected by the host computing device.

4. The system of claim 1, wherein the second portion of the biometric data is of a resolution lower than that of the biometric data transmitted to the host computing device.

5. The system of claim 1, wherein the processor is further configured to receive an entire biometric image, and to verify a similarity between the second portion of the biometric data and the corresponding first portion of the biometric image.

6. The system of claim 1, wherein the plurality of authentication steps further includes extracting an extracted template from the biometric image.

7. The system of claim 6, wherein the extracted template includes biometric minutiae extracted from the biometric image.

8. The system of claim 7, wherein the validating further includes:
    receiving the extracted template; and
    verifying similarity between minutiae extracted by the biometric sensor from the second portion of the biometric image and the biometric minutiae of the template.

9. The system of claim 8, wherein the plurality of authentication steps further includes matching the extracted template with an enrollment template stored at the host computing device.

10. The system of claim 9, wherein the enrollment template is encrypted during an enrollment process, and decrypted for purposes of matching the enrollment template.

11. The system of claim 9, wherein, the validating further includes:
    receiving a match parameter from the host computing device; and
    comparing the enrollment template with the extracted template, using the match parameter.

12. A method, comprising:
    sensing, at a sensor, a biometric image of a biometric of a user to obtain biometric data;
    retaining, at the sensor, a second portion and not all of the biometric data;
    transmitting the biometric data corresponding to the biometric image to a host computing device separate from the sensor, wherein the host computing device performs a plurality of authentication steps to authenticate the user as being identified by the biometric data, wherein the plurality of authentication steps comprises producing a first result at the host computing device by comparing a template extracted by the host computing device from a first portion of the biometric data to a stored template stored by the host computing device; and
    validating, at the sensor, the at least one and not all of the plurality of authentication steps utilizing authentication information received from the host computing device relating to results of the host computing device performing the at least one of the plurality of authentication steps by comparing a template extracted by the sensor from the second portion of the biometric data retained by the sensor and corresponding to the first portion utilized by the host computing device, to produce a second result, and comparing, by the sensor, the first result with the second result.

13. The method of claim 12, wherein the portion of the biometric data is randomly selected.

14. The method of claim 12, wherein the portion of the biometric data is of a resolution lower than that of the biometric data transmitted to the host computing device.

15. The method of claim 12, wherein the validating includes:
   receiving, at the sensor, the biometric image; and
   verifying, at the sensor, a similarity between the second portion of the biometric data and a corresponding portion of the biometric image.

16. The method of claim 12, wherein the plurality of authentication steps further includes extracting a swipe template from the biometric image.

17. The method of claim 16, wherein the swipe template includes biometric minutiae.

18. The method of claim 17, wherein the validating further includes:
   receiving the swipe template; and
   verifying a similarity between biometric minutiae existing in the second portion of the biometric data and the biometric minutiae of the swipe template.

19. The method of claim 18, wherein the plurality of authentication steps further includes matching the swipe template with an enrollment template stored at the sensor.

20. A non-transitory machine readable medium storing instructions that, when executed by a computing device, cause the computing device to perform a method, the method comprising:
   sensing, at a sensor, a biometric image of a biometric of a user to obtain biometric data;
   retaining, at the sensor, a second portion and not all of the biometric data;
   transmitting the biometric data corresponding to the biometric image to a host computing device separate from the sensor for the host computing device to perform a plurality of authentication steps to authenticate the user as being identified by the biometric data, wherein the plurality of authentication steps comprises producing a first result by the host computing device by comparing a template extracted by the host computing device from a first portion of the biometric data to a stored template stored by the host computing device; and
   validating, at the sensor, the at least one and not all of the plurality of authentication steps utilizing authentication information received from the host computing device relating to results of the host computing device performing the at least one of the plurality of authentication steps by comparing a template extracted by the sensor from the second portion of the biometric data retained by the sensor and corresponding to the first portion utilized by the host computing device, to produce a second result, and comparing, at the sensor, the first result with the second result.

* * * * *